Oct. 13, 1925.

R. M. LOVEJOY

SHOCK ABSORBER

Filed Nov. 10, 1921

1,557,298

Inventor—
Ralph M. Lovejoy.
By—Heard Smith & Tennant.
Attorneys.

Patented Oct. 13, 1925.

1,557,298

UNITED STATES PATENT OFFICE.

RALPH M. LOVEJOY, OF MEREDITH, NEW HAMPSHIRE.

SHOCK ABSORBER.

Application filed November 10, 1921. Serial No. 514,378.

*To all whom it may concern:*

Be it known that I, RALPH M. LOVEJOY, a citizen of the United States, and resident of Meredith, county of Belknap, State of New Hampshire, have invented an Improvement in Shock Absorbers, of which the following description, in connection with the accompanying drawing, is a specification, like characters on the drawing representing like parts.

This invention relates to improvements in shock absorbers adapted to cushion the movement of two relatively movable members and the general object thereof is to provide a novel form of shock absorber which will be economical in construction and efficient in operation.

More particularly the invention comprises certain improvements upon the shock absorber disclosed in my Patent No. 1,324,913, granted December 16, 1919, which construction comprises a casing adapted to be secured to one of the relatively movable members, having a liquid-containing chamber and a cylinder therein, a piston reciprocably mounted in said cylinder having means adapted to be connected to the other relatively movable member and means for permitting the free flow of liquid from the liquid-containing chamber to the cylinder when the piston is moved in one direction and for restricting the flow of liquid from the cylinder to said chamber when the piston is moved in the opposite direction. In that construction the ports for establishing communication between the liquid-containing chamber and the cylinder are located in the walls of the cylinder. One of the objects of the present invention is to provide a construction in which a valve is located in the piston instead of the cylinder which, although broadly equivalent in function to the valve or valves in the cylinder wall, involves a novel structure and enables the shock absorber to be more economically constructed.

Another object of the invention is to provide a shock absorber construction in which the liquid-containing chamber or reservoir may be made of smaller capacity than in the previous construction, thereby enabling the size of the instrument to be considerably reduced.

A further object of the invention is to provide the piston with a novel form of valve operable to permit the free flow of the liquid through a port in the piston when the piston is moved in one direction and to restrict the flow of liquid through said port when the piston is moved in the opposite direction.

A further object of the invention relates to an improved valve cage and valve for effecting the function above described.

A further feature of the invention consists in providing novel means for retaining the valve cage seated upon the piston head.

A further object of the invention is to provide an improved means for venting the compression portion of the cylinder which also serves to lubricate the bearing between the piston and the member to which it is pivotally connected.

A further object of the invention is to provide a new type of bearing for the connection between the piston head and the reciprocable member with which it is connected.

These and other objects and features of the invention will more fully appear from the following description and the accompanying drawings and will be particularly pointed out in the claims.

A preferred embodiment of my invention is illustrated in the accompanying drawing as applied to a shock absorber of the general type disclosed in my prior patent aforesaid.

Figure 1:
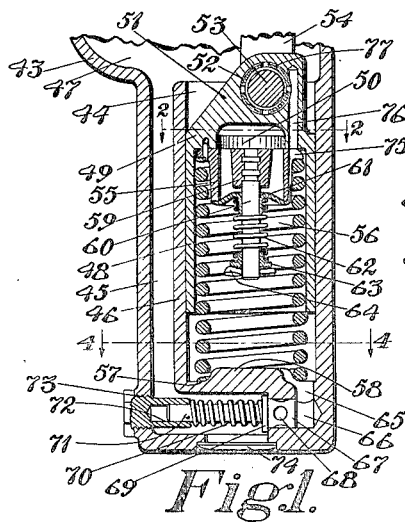
Fig. 1 is a vertical longitudinal sectional view of the lower portion of the liquid-containing chamber, the cylinder and the piston and valve mechanisms.
Figure 2:
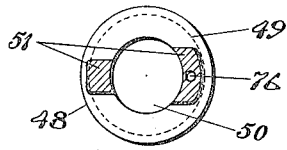
Fig. 2 is a transverse sectional view through the piston head on line 2—2, Fig. 1.
Figure 5:
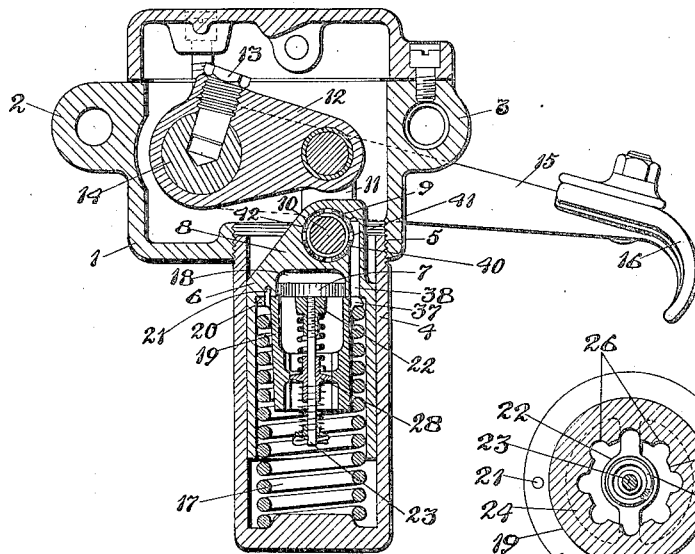
Fig. 5 is a vertical longitudinal sectional view of a preferred form of shock absorber embodying my invention.

The general construction of the shock absorbers illustrated in Figs. 1 and 5 is similar to the construction illustrated in my prior patent aforesaid in that each comprises a casing adapted to be secured to one of the relatively movable members, such as the frame of an automobile, and an arm pivoted in said casing adapted to be secured to the other relatively movable member, such as the axle of an automobile, the pivotal shaft of said arm having secured thereto an interior arm within the casing which is connected to a piston reciprocable in a cylinder, means being provided for permitting a substantially free flow of the liquid into the cylinder when the piston is moved in one direction and means also being provided for restricting the flow of liquid from the compression portion of the cylinder when the piston is moved in the opposite direction.

Inasmuch as the assembled construction is illustrated more fully in Fig. 5, this preferred embodiment will be specifically described, particularly as the equivalent mechanisms contained in the construction illustrated in Fig. 1 are in many respects similar to or identical therewith.

The construction illustrated in Fig. 5 comprises a liquid-containing casing or reservoir 1 provided with ears 2 and 3 by means of which the same may be rigidly secured to one of the movable members, such as the frame of an automobile. A cylinder 4, which may be formed integral with the casing, but which preferably is secured thereto by a screw threaded connection 5, extends preferably downwardly from the casing and its open end communicates freely with the interior of the liquid-containing chamber of the casing 1. A piston 6, preferably of tubular form, is reciprocably mounted in the casing and is provided with a preferably central annular port 7 through its head. The upper portion of the piston head is provided with a boss 8 having a journal 9 in which a shaft 10 is mounted. The shaft 10 is connected by a link 11 to an interior arm 12 which is connected by a screw threaded stud 13 to a rock shaft 14 which is provided with an exterior arm 15 having at its free end a clamp 16 adapted to be connected to a flexible member which in turn is adapted to be connected to the other relatively movable member, such as the axle of an automobile, as disclosed in my prior patent aforesaid.

A helical spring 17, seated at its lower end upon the end wall of the cylinder and at its upper end acting upon the piston head, serves normally to raise the piston and thereby maintain taut the flexible connection between the arm 15 and the relatively movable member to which it is connected.

It will be obvious that any relative movement between the relatively movable members, such as the frame and axle of an automobile, will cause a reciprocation of the arm 15 which, acting through the rock shaft and interior arm 12, will reciprocate the piston 6 within the cylinder 4.

In the constructions illustrated both in Figs. 1 and 5, a suitable valve mechanism is provided for permitting the free flow of the liquid through the port in the piston into the cylinder and in both constructions means are provided for restricting the flow of liquid from the cylinder into the liquid-containing chamber or reservoir.

In each of the constructions the boss or web 8 upon the piston head is provided with a recess 18 above the port 7 for the purpose of permitting the liquid to flow freely into the port.

In each of the constructions illustrated in Figs. 1 and 5 a suitable valve cage is seated upon the under face of the piston head and desirably is retained on its seat by means of a laterally extending flange which is engaged by the upper end of the helical spring which serves normally to raise the piston within the cylinder.

Figure 3:
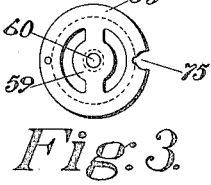
Fig. 3 is a plan view of a preferred form of valve cage.
Figure 4:
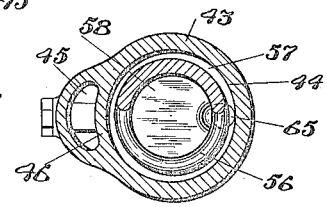
Fig. 4 is a transverse sectional view on line 4—4, Fig. 1.
Figure 6:
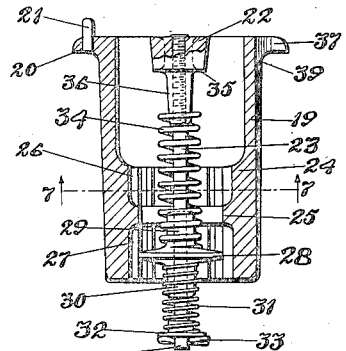
Fig. 6 is an enlarged detail view, mainly in vertical section, of the valve cage and valve illustrated in Fig. 5, and, Fig. 7 is a horizontal sectional view of the cage on line 7—7, Fig. 6.
Figure 7:
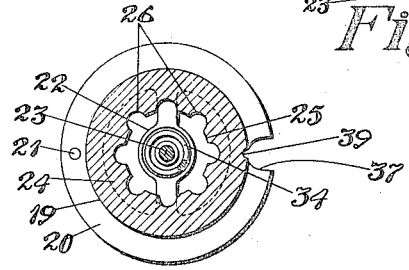

In the particular embodiment illustrated in Figs. 5 and 6 the valve cage comprises a casing 19 of general cylindrical contour having a flange 20 which engages the under face of the cylinder head and is prevented from rotating relatively thereto by a pin 21 extending through said flange into the cylinder head. The valve cage is provided with a transverse web or spider 22, desirably of the form illustrated in Fig. 3, having an enlarged central portion in which is secured a stud 23 which extends axially of the cylinder 4. The casing 19 of the valve cage is provided with a cylindrical portion 24 having a cylindrical valve seat 25, preferably but not necessarily intermediate of its ends. The cylindrical portion 24 of the valve cage desirably is provided with longitudinally extending grooves 26 extending upwardly from the valve seat and also may be provided with similar grooves 27 extending downwardly from the valve seat. These grooves may be of the same or different size and depth as may be desired.

A valve 28, having a cylindrical periphery and provided with oppositely extending hubs 29 and 30, is reciprocably mounted upon the stud 23. The periphery of the valve 28 fits slidably upon the valve seat 25 and when within the area of the valve seat 25 serves to prevent the flow of the liquid therethrough and, consequently, effectively closes the port 7. When, however, the valve is moved to either side of the cylindrical valve seat the liquid is permitted to flow more or less freely in one direction or the other dependent upon the relation of the movement of the piston and the distance the valve is displaced from the valve seat. A helical spring 31, engaging an abutment 32 which is conveniently secured to the end portion of the valve stem 23 by a cotter pin 33, or other fastening, abuts at its upper end against the valve 28 and tends normally to press it toward its seat 25. A similar but heavier helical spring 34 mounted upon the stem 23 and abutting upon the opposite side of the valve 28 tends normally to force the valve downwardly toward its seat. The upper end of the spring 34 abuts gently against the shoulder 35 on the spider 22 when the valve is seated or located within the cylindrical valve seat 25.

In this preferred construction the central portion of the spider 22 is provided with a downwardly-projecting, preferably conical, boss 36 which serves the double purpose of providing a guide for the upper portion of the helical spring and also an elongated seat for the stem 23.

The annular flange 20 of the valve cage desirably is provided with a recesses 37 adapted to communicate with a conduit 38 leading through the wall of the journal 9 and the bottom of the recess 37 desirably also is provided with a depression or bent groove 39 to insure passage of the liquid into the conduit in case the spring should tend to close more or less the recess 37.

The liquid passing through the conduit 38 enters the journal 9 and passes out of the ends thereof. This construction provides for a restricted flow of the liquid which aids in dissipating the lighter shocks and also provides a vent for any air which may be trapped in the upper portion of the cylinder beneath the piston in the filling of the device, or which may enter into the lower portion of the cylinder upon upward movement of the piston.

Desirably the journal is provided with a bushing 40 which has a running fit within the journal so that during the operation of the device the bushing may creep around in such a manner that it will wear evenly. If desirable the bushing may be provided with a series of one or more ports 41 passing through the bushing so that the liquid may be discharged between the outer wall of the bushing and the journal and also may be discharged between the inner wall of the bushing and the stud or shaft 10. The shaft if desired may be provided with an annular groove 42 to provide a greater capacity for receiving the liquid which passes through the conduit 38 into the journal. By reason of this construction a sufficient venting is provided to prevent foaming of the liquid in the cylinder and a proper lubrication of the bearing is at all times insured.

When in the operation of the device the normal pressure upon the end of the arm 15 is relieved, as by the compression of the spring of an automobile when used as above described, the spring 17 acts upon the lower face of the piston to raise the piston. The light spring 31 then yields to the pressure of the liquid above it and the liquid flows freely downwardly through the port 7 and past the valve seat 25 into the lower portion of the cylinder. As soon as this yielding movement of the arm 15 is arrested and the recoil movement in the other direction takes place the valve is returned to its seat and the heavy spring 34 then resists further movement of the valve, holding the same in its seat until the pressure becomes sufficient to displace the valve from its seat, whence it is moved upwardly and communication established through the grooves 26 in the upper cylindrical portion 24 of the valve cage. This spring 34 is of sufficient strength to restrict the upward passage of the liquid and, consequently, arrests the downward movement of the piston and thereby cushions the movement of the relatively movable members. The grooves in the upper part of the cylindrical portion of the valve cage may be of the same cross-sectional area as illustrated, or may be made of decreasing or increasing cross-sectional area, if desired, so as to vary the effective resistance to the passage of the liquid. Consequently, they may be so constructed as to create a resistance to the flow of liquid in correlation to the pressure exerted upon the arm 15 of the shock absorber by reason of the relative movement of the members to which the arm and casing are attached. The grooves in the lower part of the cylindrical portion of the valve cage may likewise be varied in cross-sectional area, if desired, or these grooves may be omitted entirely since it is desirable that the construction shall provide for the free downward flow of the liquid. In case of the omission of the grooves it is desirable that three or more ribs shall be provided for the purpose of guiding the valve.

The construction illustrated in Fig. 1 is similar in function to that disclosed in Fig. 5. It comprises a cylinder, a piston reciprocable therein having a port provided with a valve for permitting the liquid to flow freely into the cylinder when the piston is moved in one direction and to prevent the flow of liquid into the cylinder when the piston is moved in the opposite direction. The connections of the casing and of the piston to the relatively movable members may be, and desirably are, the same as those heretofore described. It differs from the construction illustrated in Fig. 5 in that a separate relief valve is provided for restricting the flow of liquid from the cylinder into the reservoir. In the construction illustrated in Fig. 1 the casing 43 is provided with a cylindrical chamber 44 and a conduit 45 extending alongside of the cylindrical chamber 44, but separated therefrom by the wall 46 of the cylindrical chamber. The upper ends of the cylinder and conduit both communicate with the reservoir 47 in the main body of the casing. A tubular piston 48 is reciprocably mounted in the cylinder and its head 49 is provided with a port 50 and with a web or boss 51 having a journal 52 for a shaft 53 which is connected by a link 54 to an interior arm corresponding to the arm 12 of the device illustrated in Fig. 5 which is connected to a rock shaft having upon its outer end an arm corresponding to the arm 15 adapted to be connected to the other relatively movable member.

A valve cage 55 is seated upon the under face of the cylinder and is held against said under face by the upper end of a helical spring 56, the lower end of which is seated upon the substantially closed lower end or head 57 of the cylinder which preferably is provided with a boss 58 which extends into the lowest coil of the spring and retains the same in proper position. The valve cage 55 is provided with a spider 59 in which a central stud 60 is cast or otherwise fixedly secured. A valve 61, preferably of stamped sheet metal, is slidably mounted upon the stud 60 and is normally supported in closed position against the valve seat, formed by the end of the valve cage, by a helical spring 62 which is supported at its lower end in any suitable manner as upon a washer 63 which rests upon a cotter pin 64 passing through a suitable hole in the stud 60. The spring 62 desirably is very light and only serves to hold the valve normally in closed position, but adapted to yield readily to permit the liquid to flow freely through the port into the lower portion of the cylinder when the piston is raised.

In this construction the lower end or head of the cylinder is provided with a port 65 which communicates with a transversely drilled hole or conduit 66 in the lower portion of the casing. The flow of liquid through this port, upon the downward movement of the piston, is restricted by a tubular valve 67 open at one end to communicate with the conduit 66 and closed at its opposite end, but having one or more ports 68 through its cylindrical wall. The valve is provided with a head 69 which is normally held, by a helical spring 70 surrounding the valve stem 71, against a shoulder upon the casing so that the tubular portion of the valve is enclosed within the wall of the casing. When, however, sufficient pressure is placed upon the liquid within the cylinder the valve will be forced from its seat sufficiently to permit the liquid to pass through the port 65, the conduit 66 and the port or ports 68 in the valve into the conduit 45 which communicates with the reservoir 47. The valve stem 71 desirably is reciprocably mounted in a tubular plug 72 which has a screw threaded portion 73 engaging complementary screw threads in the wall of the conduit 45.

For convenience in construction and assembly the lower portion of the casing may be provided with a suitable aperture adapted to be closed by an expanded sheet metal disk or plate 74.

In this construction, as in that disclosed in Fig. 5, the flange of the valve cage is provided with an aperture 75 and a suitable vent which communicates with a conduit 76 leading to the journal 52, and the journal 52 desirably is provided with a creeping bushing 77 of the character heretofore described.

In the operation of the device illustrated in Fig. 1, an upward movement of the piston, due to the movement of the relatively movable members, such as the compression of the spring of an automobile, where the casing is fastened to the frame and the arm of the shock absorber to the axle, causes the liquid to flow through the port 50 in the piston into the cylinder as the valve 61 yields readily during this movement of the piston. Upon the reverse movement of the relatively movable members the valve 61 seats firmly upon the valve cage and prevents the liquid from passing upwardly through the port in the piston. The downward movement of the piston forces the liquid through the port 65 and conduit 66 and thereby forces back the valve 67 until it flows through the port or ports 68 thereof into the conduit 45 through which it returns to the reservoir 47.

In this construction, as in that illustrated in Fig. 5, the conduit 76 in the piston head permits the escape of any air which may be trapped in the cylinder, prevents foaming, and also serves to lubricate the bearing, and also aids in cushioning slight movements of the piston.

It will thus be apparent that my invention comprises broadly a shock absorber having a cylinder provided with a piston having a valve-controlled port through which liquid may be passed freely into the cylinder, with means for restricting the flow of liquid from the cylinder, whether the means for restricting the flow from the cylinder is located in the piston or in the wall of the cylinder or casing.

It will be noted that in each of the constructions disclosed herein the portion of the instrument, which comprises or contains the cylinder, is much smaller than that disclosed in my previous construction, and that the mechanism, though similar in function to that of my patented construction, is of a specifically different character and somewhat simplified and that various entirely novel features have been embodied in the present construction.

It will be understood that the embodiment of the invention disclosed herein is of an illustrative character and is not restrictive and that various changes in form, construction and operation of parts may be made within the spirit and scope of the following claims.

Having thus described my invention, what I claim as new, and desire to secure by Letters Patent, is:

1. A shock absorber for cushioning the movement of two relatively movable members comprising a casing adapted to be secured to one of said members and having a tubular liquid-containing cylinder, a piston reciprocable in said cylinder, means connecting said piston to the other relatively movable member, a port in said piston, a valve cage seated upon said piston head communicating with said port and presenting a valve seat, a valve co-operating with said valve seat operable to establish a substantially free flow of the liquid through said port when the piston is raised, a spring engaging said valve cage acting to hold said valve cage in seated position during the movement of the piston and also tending to raise the piston and means for restricting the flow of liquid through said port during the downward movement of the piston.

2. A shock absorber for cushioning the movement of two relatively movable members comprising a casing adapted to be secured to one of said members and having a tubular liquid-containing cylinder, a piston reciprocable in said cylinder, means connecting said piston to the other relatively movable member, a port in said piston, a tubular valve cage seated upon said piston head communicating with said port and having an axial stem and a valve seat, a spring-actuated valve mounted upon said stem in co-operative relation to said valve seat and operable to establish a substantially free flow of the liquid through said port when the piston is moved in one direction and means for restricting the flow of liquid through said port when the piston is moved in the opposite direction.

3. A shock absorber for cushioning the movement of two relatively movable members comprising a casing adapted to be secured to one of said members and having a tubular liquid-containing cylinder, a piston reciprocable in said cylinder, means connecting said piston to the other relatively movable member, a port in said piston, a tubular valve cage seated upon said piston head communicating with said port and having an axial stem, a cylindrical valve seat in said valve cage, a valve reciprocably mounted on said stem slidably fitting said seat and resilient means acting upon opposite sides of said valve to permit a substantially free flow of liquid through said port when the piston is moved in one direction and to restrict the flow of liquid through said port when the piston is moved in the opposite direction.

4. A shock absorber for cushioning the movement of two relatively movable members comprising a casing adapted to be secured to one of said members and having a tubular liquid-containing cylinder, a piston reciprocable in said cylinder, means connecting said piston to the other relatively movable member, a port in said piston, a tubular valve cage, seated upon said piston head communicating with said port, having an axial stem, and a cylindrical portion provided with a cylindrical valve seat and with grooves extending from said valve seat toward the upper end of said cylindrical portion, a valve reciprocably mounted on said stem, slidably fitting said valve seat, a light spring carried by said stem acting upon the under side of said valve and a relatively heavy spring acting upon the upper side of said valve whereby said valve will permit a substantially free flow of liquid through said port into the lower portion of said cylinder upon upward movement of the piston and will act to restrict the flow of liquid through said port when the piston is moved downwardly.

5. A shock absorber for cushioning the movement of two relatively movable members comprising a casing adapted to be secured to one of said members and having a tubular liquid-containing cylinder, a piston reciprocable in said cylinder, means connecting said piston to the other relatively movable member, a port in said piston, a tubular valve cage, seated upon said piston head communicating with said port, having an axial stem, and a cylindrical portion provided with a cylindrical valve seat, grooves in said cylindrical portion extending in opposite directions from said cylindrical valve seat, a valve reciprocably mounted on said stem, slidably fitting said valve seat, a light spring carried by said stem acting upon the under side of said valve and a relatively heavy spring acting upon the upper side of said valve whereby said valve will permit a substantially free flow of liquid through said port into the lower portion of said cylinder upon upward movement of the piston and will act to restrict the flow of liquid through said port when the piston is moved downwardly.

6. A shock absorber for cushioning the movement of two relatively movable members comprising a casing adapted to be secured to one of said members having a tubular liquid-containing cylinder, a piston reciprocably mounted in said cylinder, means connecting said piston to the other relatively movable member, a port in the head of said piston, a valve cage seated upon the piston head communicating with said port and presenting a valve seat, a spring actuated valve carried by said cage in cooperative relation to said valve seat and a helical spring seated at one end upon the head of said cylinder and at the other end engaging said valve cage and acting to hold the same against said cylinder head and also normally to raise said piston, said valve spring being operable to permit a substantially free flow of liquid through said port into the lower portion of said cylinder when the piston is moved upwardly and means for restricting the flow of liquid from the lower portion of said cylinder when the piston is moved downwardly.

7. A shock absorber for cushioning the movement of two relatively movable members comprising a casing adapted to be secured to one of said members having a tubular liquid-containing cylinder, a piston reciprocably mounted in said cylinder, means connecting said piston to the other relatively movable member, a port in the head of said piston, a tubular valve cage seated upon said piston head communicating with said port, having an axial stem, and presenting a cylindrical valve seat, a valve reciprocably mounted upon said stem, slidably fitting said seat, resilient means acting upon opposite sides of said valve to permit a substantially free flow of liquid through said port when the piston is moved in one direction and to restrict the flow of liquid through said port when the piston is moved in the opposite direction, a helical spring seated upon the head of said cylinder and at its opposite end engaging said valve cage and acting to hold the same against the piston head and tending normally to raise the piston in said cylinder.

8. A shock absorber for cushioning the movement of two relatively movable members comprising a casing adapted to be secured to one of said relatively movable members, presenting a liquid receptacle, a cylinder extending from said casing, a rock shaft pivotally mounted in said casing having an exterior arm adapted to be connected to the other relatively movable member and an interior arm within said casing, a piston reciprocably mounted in said cylinder, means connecting said piston to said interior arm, a port in said piston and a valve for said port operable when the piston is moved in one direction to permit a substantially free flow of liquid through said port into said cylinder and to restrict the flow of liquid through said port when the piston is moved in the opposite direction.

9. A shock absorber for cushioning the movement of two relatively movable members comprising a casing adapted to be secured to one of said relatively movable members, presenting a liquid receptacle, a cylinder detachably secured to said casing, a rock shaft, pivotally mounted in said casing, having an exterior arm adapted to be connected to the other relatively movable member and an interior arm within said casing, a piston reciprocably mounted in said cylinder, means connecting said piston to said interior arm, a port in said piston and a spring-actuated valve for said port operable when the piston is moved in one direction to permit a substantially free flow of liquid through said port and to restrict the flow of liquid through said port when the piston is moved in the opposite direction.

10. A shock absorber for cushioning the movement of two relatively movable members comprising a casing adapted to be secured to one of said relatively movable members, presenting a liquid receptacle and a cylinder, a piston reciprocable in said cylinder having a port in its head, a valve for said port operable to permit a free flow of liquid through said piston head upon movement of the piston in one direction and means to restrict the flow of liquid from the cylinder when the piston is moved in the opposite direction, means adapted to be connected to the other movable member having a pivotal bearing in said piston head comprising a floating bushing and a conduit in said piston head leading from the under face thereof to said bearing.

11. A shock absorber for cushioning the movement of two relatively movable members comprising a casing adapted to be secured to one of said relatively movable members, presenting a liquid receptacle and a cylinder, a piston reciprocable in said cylinder having a port in its head, a valve for said port operable to permit a free flow of liquid through said piston head upon movement of the piston in one direction and means to restrict the flow of liquid from the cylinder when the piston is moved in the opposite direction, means adapted to be connected to the other movable member having a pivotal bearing in said piston head comprising a floating bushing and a conduit in said piston head leading from the under face thereof to said bearing tangentially of said bushing and apertures in said bushing communicating with said conduit.

12. A shock absorber for cushioning the movement of two relatively movable members comprising a casing adapted to be secured to one of said relatively movable members presenting a liquid receptacle and a cylinder, a piston reciprocable in said cylinder having a port in its head, a valve cage, registering with said port, having a flange seated upon the under face of the piston head, a spring in the cylinder engaging the flange on said valve cage and normally acting to retain said valve in place and to raise the piston, a valve for said port mounted in said cage operable to permit a free flow of liquid through said piston head upon movement of the piston in one direction, means to restrict the flow of liquid from the cylinder when the piston is moved in the opposite direction, means adapted to be connected to the other relatively movable member having a pivotal connection with said piston head, a conduit in said piston head leading from the under face thereof to said bearing, an aperture in the flange of said valve cage communicating with the conduit in the piston head adapted to establish communication therewith irrespective of the position of the piston supporting spring which is seated upon said flange and means for preventing rotative movement of said valve cage relatively to the piston head.

13. A shock absorber for cushioning the movement of two relatively movable members comprising a casing adapted to be secured to one of said members and having a tubular liquid-containing cylinder, a piston reciprocable in said cylinder, means connecting said piston to the other relatively movable member, a port in said piston, a valve for said port, a tubular guide for said valve provided with a cylindrical valve seat having a sliding fit upon said valve and resilient means acting upon opposite sides of said valve to permit a substantially free flow of the liquid through said port when the piston is moved in one direction and to restrict the flow of liquid through said port when the piston is moved in the opposite direction.

14. A shock absorber for cushioning the movement of two relatively movable members comprising a casing adapted to be secured to one of said members and having a tubular liquid-containing cylinder, a piston reciprocable in said cylinder, means connecting the piston to the other relatively movable member, a port in said piston, a tubular valve guide rigid with said piston head communicating with said port and having an axial stem and a cylindrical valve seat, a valve reciprocably mounted on said stem slidably fitting said seat, a light spring carried by said stem acting upon one side of said valve and a relatively heavy spring acting upon the other side of said valve whereby said valve will permit a substantially free flow of liquid through the port when the piston is moved in one direction and will act to restrict the flow of liquid through said port when the piston is moved in the opposite direction.

In testimony whereof, I have signed my name to this specification.

RALPH M. LOVEJOY.